G. H. GRAHAM.
MAIL MARKING MACHINE.
APPLICATION FILED OCT. 13, 1910.
1,022,191.
Patented Apr. 2, 1912.
5 SHEETS—SHEET 1.
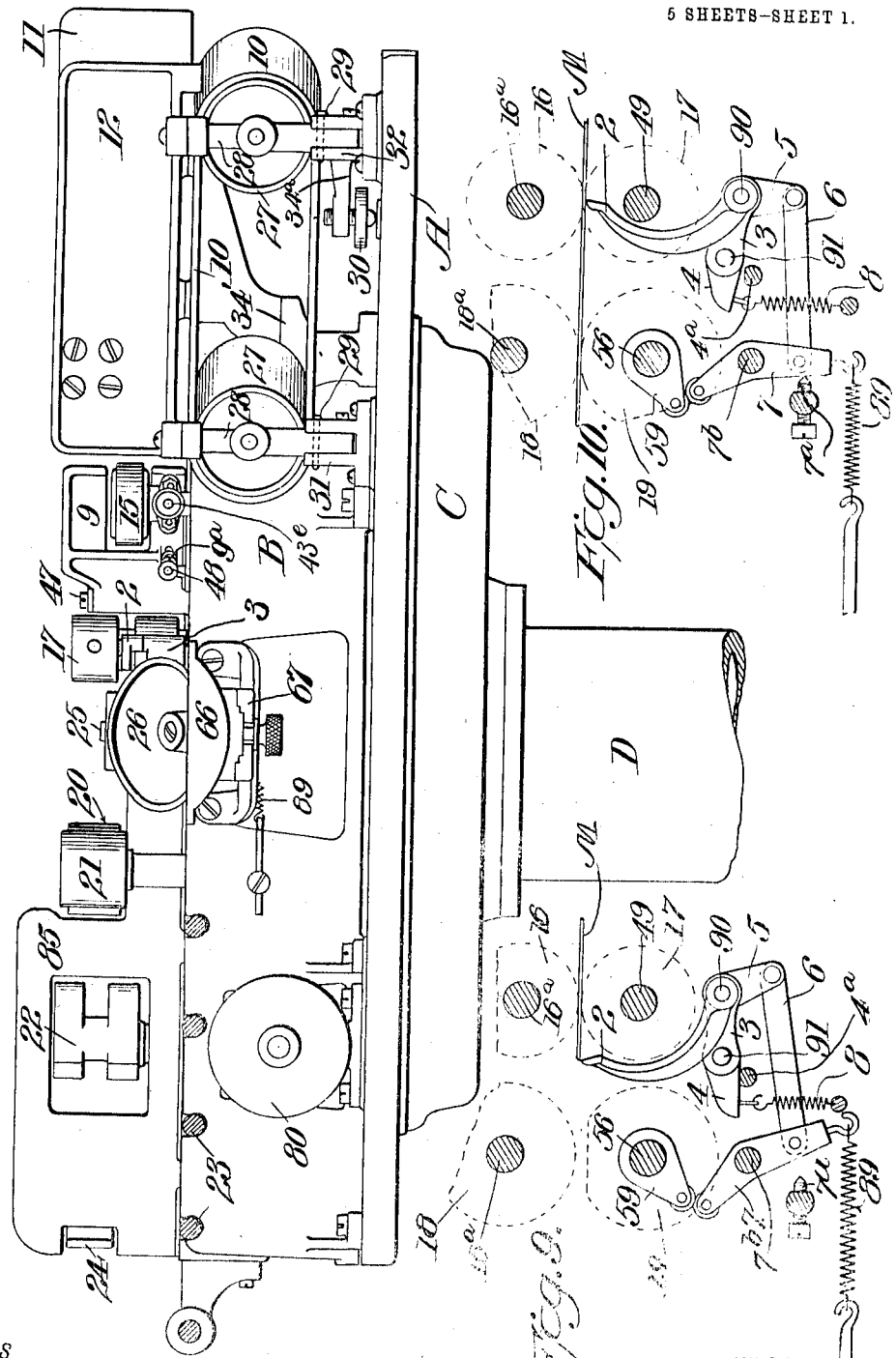

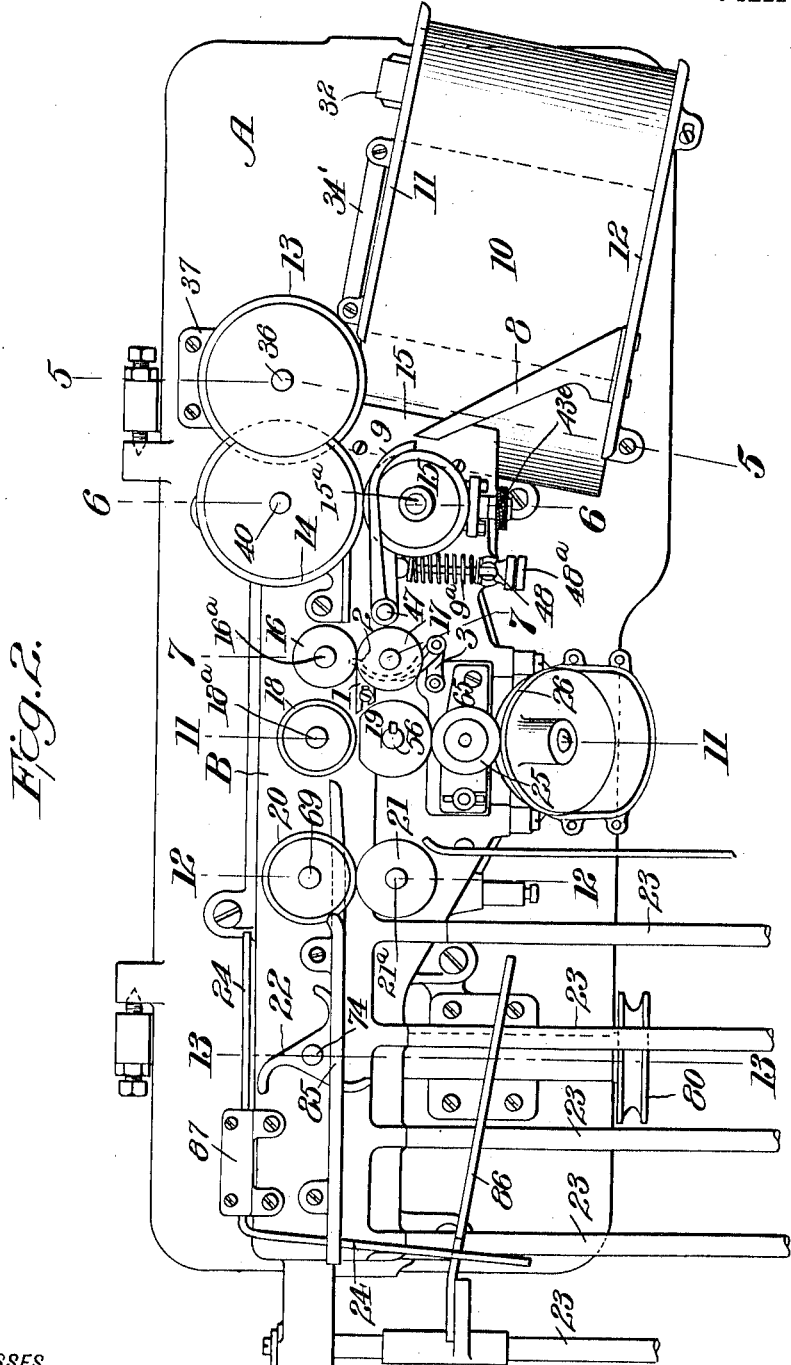

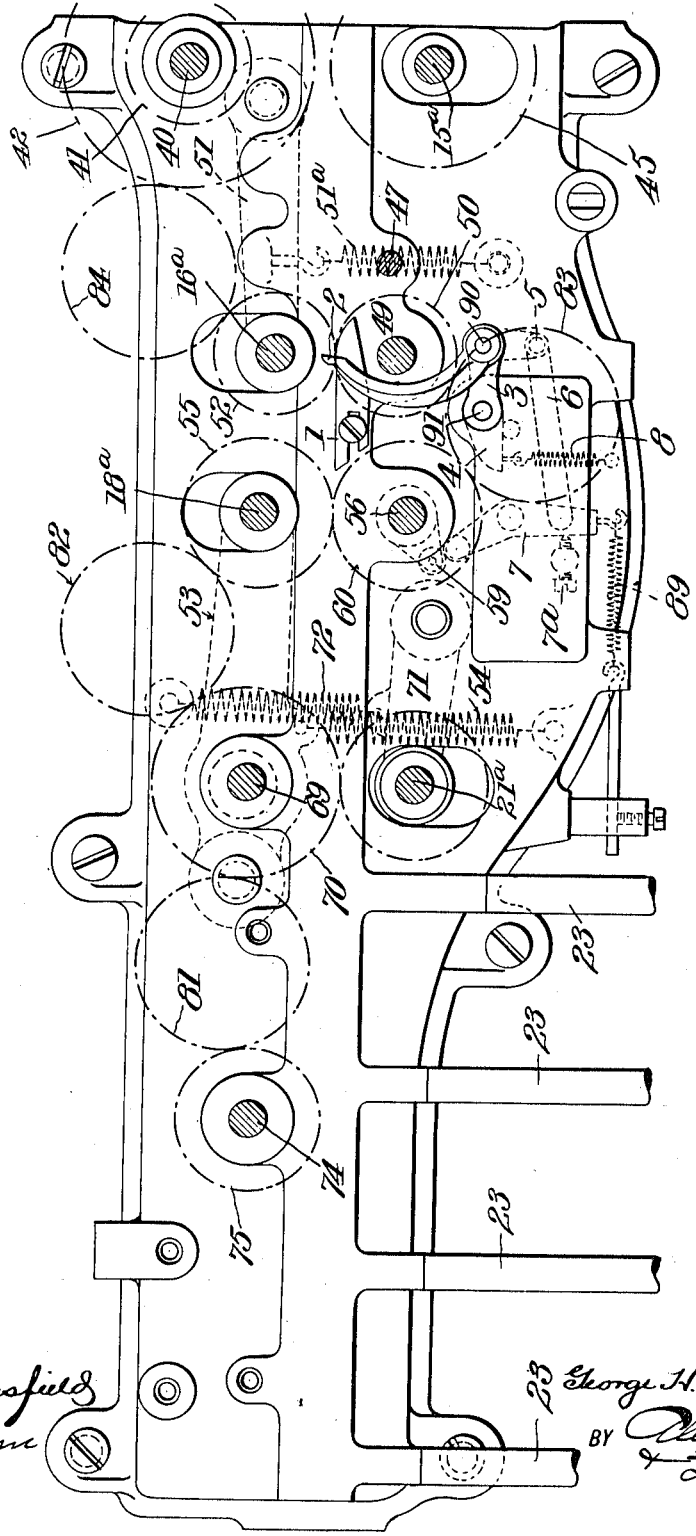

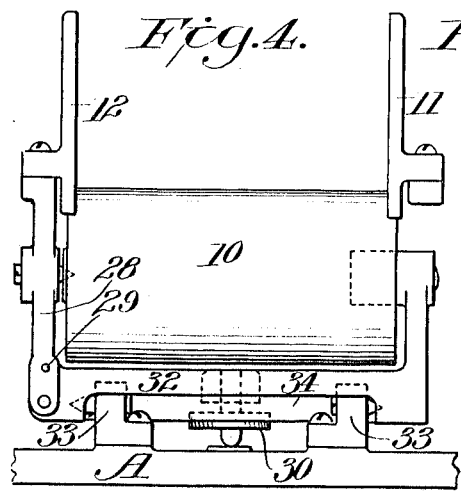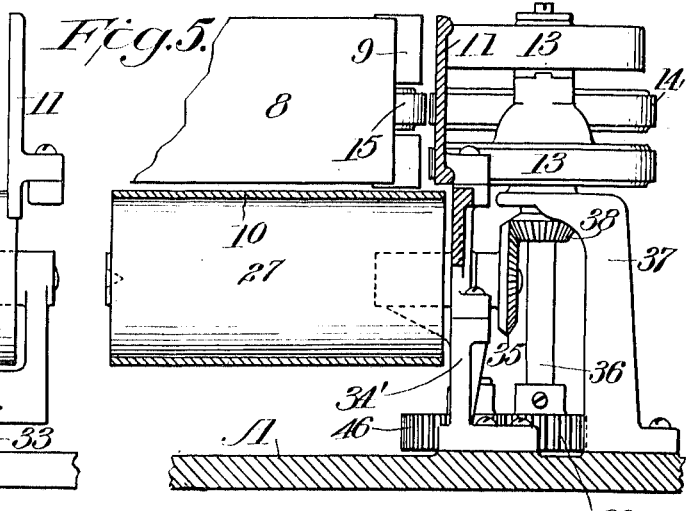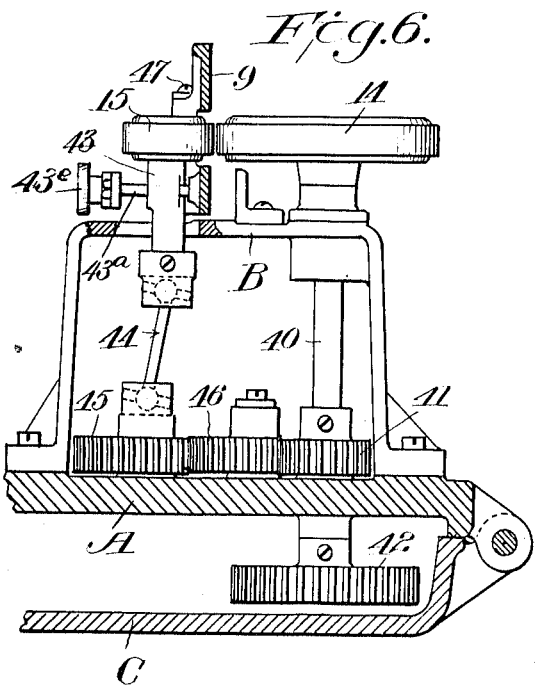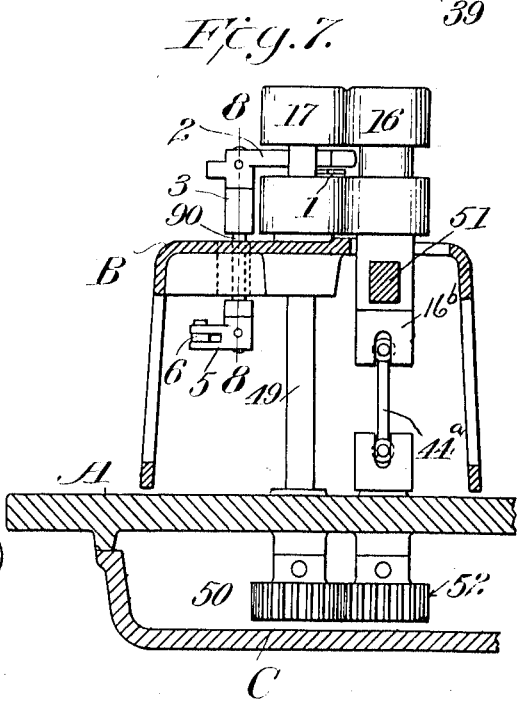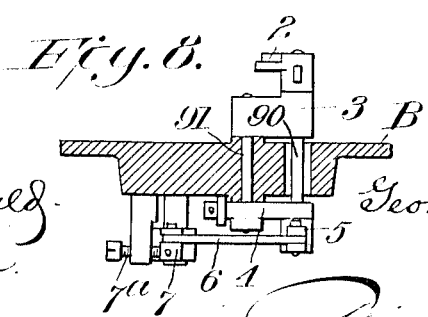

G. H. GRAHAM.
MAIL MARKING MACHINE.
APPLICATION FILED OCT. 13, 1910.
1,022,191.
Patented Apr. 2, 1912.
5 SHEETS—SHEET 5.
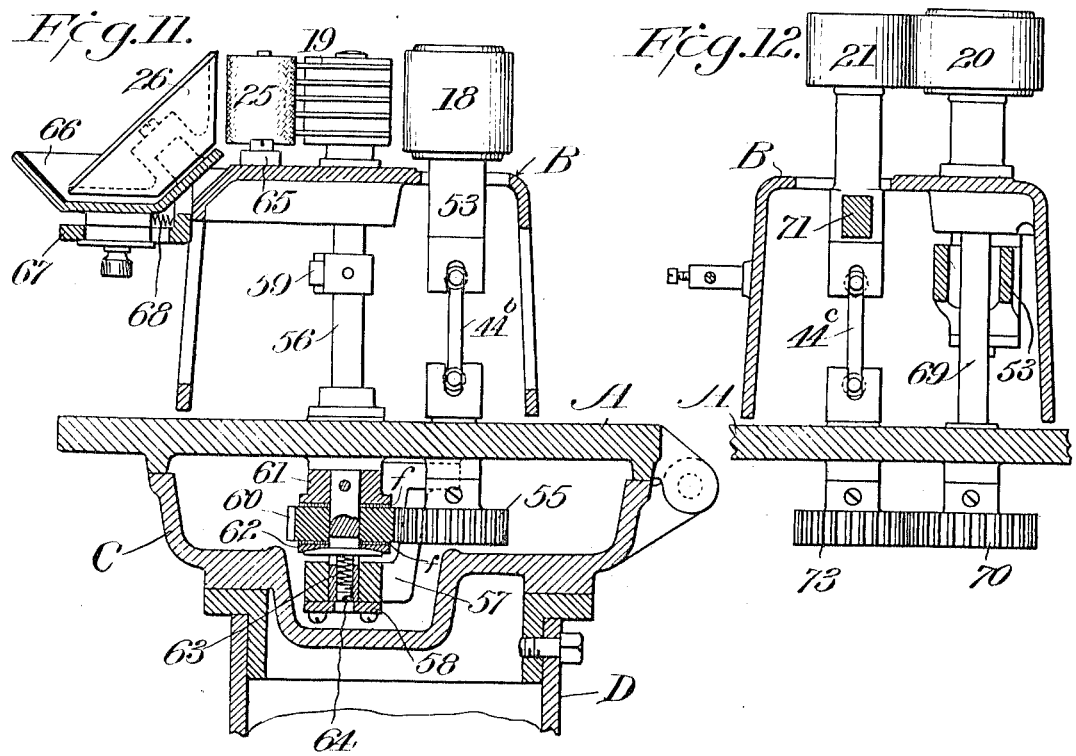
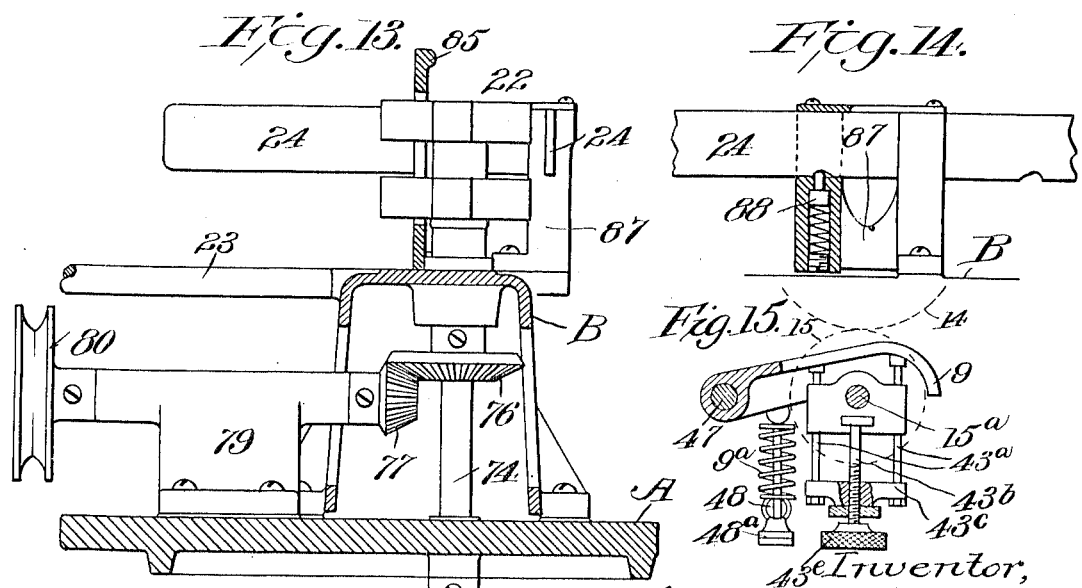
Witnesses:
James B. Mansfield
L. E. Witham
Inventor,
George H. Graham
By:
Alexander & Powell
Attorneys

UNITED STATES PATENT OFFICE.

GEORGE H. GRAHAM, OF JERSEY CITY, NEW JERSEY, ASSIGNOR TO UNIVERSAL STAMPING MACHINE COMPANY, OF NEW YORK, N. Y., A CORPORATION OF NEW JERSEY.

MAIL-MARKING MACHINE.

1,022,191.　　　　Specification of Letters Patent.　　Patented Apr. 2, 1912.

Application filed October 13, 1910. Serial No. 586,957.

*To all whom it may concern:*

Be it known that I, GEORGE HERBERT GRAHAM, of Jersey City, in the county of Hudson and State of New Jersey, have invented certain new and useful Improvements in Mail-Marking Machines; and I hereby declare that the following is a full, clear, and exact description thereof, reference being had to the accompanying drawings, which form part of this specification.

The present invention is an improved means for canceling the stamps on mail matter and post-marking the same; and its object is to provide a machine very simple in construction, accurate in action, and capable of operating at very high speed.

Heretofore mail marking machines have been made in which the mail matter is automatically fed to devices for canceling the stamps and post-marking the mail and stacking the same when marked in orderly manner. Such machines, as heretofore made, have been complicated, expensive to construct, difficult to maintain in order, and easily disarranged if handled by unskilled persons.

The object of the present invention is to provide a machine in which the operative parts have been greatly reduced in number and simplified in construction. And the invention provides (1) novel means whereby the main feed belt can be readily removed, adjusted or changed, and replaced, if necessary. (2) A novel construction of and support for the reversely rotating separator roll; (3) a novel construction and arrangement of trip mechanism controlling the operation of the marking devices,—and whereby the more delicate and active parts of such mechanism are located beneath the table of the machine, and thereby protected from the dust and dirt which unavoidably accumulates upon the table during the use of such machine, and are also protected from liability to be injured by dropping of mail matter or other objects thereon. Further the trip mechanism is made practically unitary and independent of other parts of the machine so that the adjustment or removal of such other parts need not disturb the trip mechanism, and vice versa. (4) A novel arrangement of die, or marking devices, and the clutch devices for operating the same so that said die is readily accessible, and removable and replaceable at will, without disturbing or removing any other part of the mechanism; and (5) a novel arrangement of inking devices.

A machine embodying the several novel features of the invention is illustrated in the accompanying drawings in which—

Figure 1 is a side elevation of the improved machine, the lower part of the supporting column being omitted. Fig. 2 is a plan view thereof, the outer ends of the mail receiving bars of the stacker being broken away. Fig. 3 is an enlarged horizontal sectional plan of a portion of the machine, many parts of which are omitted, and showing by dotted lines the connective gearing. Fig. 4 is an end view of the horizontal traveling belt and its immediate supports. Fig. 5 is a cross sectional elevation taken substantially on the line 5—5, Fig. 2. Fig. 6 is a similar view taken on the line 6—6, Fig. 2. Fig. 7 is a similar view taken on line 7—7, Fig. 2. Fig. 8 is a longitudinal vertical sectional elevation taken on the line 8—8, Fig. 7. Figs. 9 and 10 are horizontal elevations of the trip mechanism shown in changed positions. Fig. 11 is a cross sectional elevation taken on the line 11—11, Fig. 2. Fig. 12 is a similar view taken on the line 12—12, Fig. 2. Fig. 13 is a similar view taken on the line 13—13, Fig. 2. Fig. 14 is a partial vertical longitudinal section of the end-stop bracket. Fig. 15 is a detail view of the devices for supporting the reversely rotating separator roller.

Referring to said drawings, the mail,— letters and post cards,—or other matter, is placed by hand in bunches on an endless horizontal traveling belt 10 and between two stationary side guides 11, 12, and in front of an inclined guide 8, the letters &c. are set longitudinally of the belt and on edge, so that the belt and guide 8 will cause the letters to move endwise successively against a primary feed roller 13, which forwards them to a second feed roller 14 and a yielding guide 9. A reversely rotating separator roller 15 is arranged beside roller 14 and permits only one piece of mail to be fed forward at a time by roller 14. From the feed roller 14 each piece of mail-matter passes between a pair of feed rollers 16, 17, and its leading edge, while in the bite of said rollers strikes the end of a trip-finger 2 and rocks said finger, as the piece is advanced by rollers 16, 17, to pass between the rubber faced impression roller 18 and the intermittently rotated die or marking roller 19, which latter is adapted to be operated by mechanism controlled by the trip-finger, as hereinafter described. Then the printed piece passes between a pair of feed rollers 20, 21, and in front of a guide 85 to and against an adjustable end stop 24; and a stacker star wheel 22 behind guide 85 moves the letters laterally outward on the stacker guide rails 23, and against a laterally yielding plate 86. The rollers 13, 14 and 15, 18 and 21 are preferably faced with rubber or other frictional material.

The aforesaid parts and their operative connections are mounted upon a main horizontal table A, with which is associated a supplemental table B; the table A being hinged to a trough-like support C which incloses the gearing and contains a supply of oil and is secured to the top of a column D having a foot (not shown) resting on the floor.

The endless belt 10 (Figs. 1, 2, 5) is carried by two drums 27 rotating in bearings provided by suitable supports fast to the top of table A. A bearing for one end of each drum is formed in an upright arm 28, each of which is pivoted at its lower end to a bracket on table A and a removable pin 29 holds each arm in vertical position. The stationary guide 12 is fastened to the upper ends of arms 28 and the guide 8 is secured to the guide 12. The endless traveling belt 10 has need for constant removal on account of wear, hence easily operated means to enable the belt to be quickly changed end for end, or replaced by a new belt, are required. By removing the two pins 29 the two arms 28 with the guides 12 and 8 may be rocked down to a horizontal position to expose the belt and the ends of the drums 27, whereupon the belt may be slipped off.

The inner bearing arm 28 is pivoted to a fixed ear 31, (Fig. 1) and the outermost arm 28 is pivoted to a rock-bar 32 supported on transverse pivots carried by ears 33 (Fig. 4) which permits bar 32 to be rocked by means of an adjusting screw tapped through an arm 34ª projecting from bar 32, and operable by a finger piece 30, and thus adjust the outer drum to either stretch or loosen the belt 10. The other end bearing for the innermost drum 27 is provided by a bracket 34′, attached to table A, and which also supports the fixed guide 11. The shaft of the inner drum 27 carries a bevel pinion 35 which meshes with a bevel pinion 38 on the shaft of the primary feed roller 13 (Fig. 5).

The feed roller 13 (Figs. 2 and 5) is a duplex roller and projects slightly over the inner edge of the belt 10, and is carried by a vertical spindle 36 having bearings in a bracket 37 and in the table A (Fig. 5), and the spindle is provided, above the table, with a spur gear 39, which meshes with an intermediate gear 46.

The secondary feed roller 14 interlaps the duplex feed roller 13 (Figs. 2, 5 and 6) and is fast to a vertical spindle 40, mounted in bearings in the tables A and B, and carrying a spur gear 41 above the table A, and another gear 42 below the table.

The guide 9 (Figs. 1, 2, 5 and 6) co-acts with roller 14 to direct the mail onward to the printing devices, and it is pivoted at its rear end on a vertical pivot 47 projecting from the table B and is yieldingly pressed inward toward roller 14 by a suitable spring 9ª strung upon a rod 48 provided with an adjusting stop nut 48ª by which the normal position of the guide and roller 15 can be varied.

The reversely rotating separator roller 15 (Figs. 1, 2, 4, 6) lies beside roller 14, and projects through an opening in guide 9. Roller 15 is carried by a short spindle 15ª mounted in a bearing 43 adjustably supported upon the guide 9, on a pair of pins 43ª projecting outwardly therefrom. A screw threaded pin 43ᵇ engaging the bearing 43 (Fig. 15), passes through a nut formed in a cross bar 43ᶜ carried by the pins 43ª and has a rotatable finger piece 43ᵉ (Fig. 6) to vary the position of the separator roller with respect to the guide and opposed feed roller. The lower end of the separator-roller spindle carries one socket of a universal joint connection 44 the other socket thereof being fast to a spur gear 45 supported in bearings on the table A, and this connection permits the separator-roller 15, and guide 9, to yield bodily with respect to the opposed feed roller 14 without disturbing the gear 45, which receives its motion from the gear 41 through an intermediate 46 (Fig. 6), which also meshes with the gear 39 to drive the primary feed roller spindle 36.

The trip feed-roller 17 (Figs. 1, 2, 7) is made in two parts to permit the proper positioning and operation of the trip-finger 2, and a fixed stripper guide 1 (Figs. 1, 2, 3); said roller 17 is carried by a vertical spindle 49 having bearings in the tables A and B and having at its lower end a spur gear 50. The companion trip pressure-roller 16 is annularly recessed to allow the protrusion of the end of the trip-finger 2 (Figs. 1, 7), and is carried by a spindle 16ᵃ mounted in a rock arm 51 pivoted to the underside of the table B, (Fig. 3) a suitable spring 51ᵃ being connected with arm 51 to permit the roller 16 to yield laterally. The spindle 16ᵃ has on its lower end one socket 16ᵇ of a universal joint 44ᵃ (Fig. 7) similar to that before described, the other socket being connected to the shaft of a spur gear 52, below the table A, in mesh with the gear 50.

The trip-finger 2 (Figs. 1-3, 7-10) is carried by a short vertical spindle 90 that passes through one end of a rock arm 3 above the table, an enlarged hole in said table, and a rocking lever 4 below the table, the rock arm and lever forming a divided support for the spindle 90 and being rigidly connected together by a short spindle 91 passing through a bearing in the table B (Figs. 8, 10). Fast on the trip-finger-spindle 90 below the lever 4, is a short arm 5 (Figs. 8, 9, 10) connected by a link 6 to one end of a rock lever 7 (pivoted on a stud 7ᵇ to the underside of table B) the free end of lever 7 carrying an idler stop roller adapted to engage an arm 59 on the die or marking roller shaft, as hereinafter explained.

The rock arm 3 and lever 4 move in one direction against the tension of a suitable spring 8 limited by a stop 4ᵃ; and the lever 7 moves in one direction against the tension of an adjustable spring 89, but is limited in its movement in the opposite direction by an adjusting stop screw 7ᵃ.

By reference to Figs. 9 and 10 it will be seen that when the leading end of an onwardly moving letter, or other piece of mail M, strikes the trip-finger 2, it swings it against the tension of spring 89, as in Fig. 9, but when the leading end of the letter passes the end of the trip-finger, the spring 89 returns the latter back toward its original position, the weaker spring 8, permitting the trip-finger to yield and move outward as in Fig. 10, while the letter is passing the trip, but holding the trip-finger in position and readiness to spring instantly back into its normal position (Fig. 3) when the rear edge of the letter M has wholly passed from the bite of the rollers 16, 17.

All of the trip mechanism except the trip-finger 2 and the arm 3, lies wholly beneath the table B (Fig. 8), and the delicate operative parts of the trip mechanism and its adjusting devices are thus protected from dirt, and further are not disturbed by the removal of any other parts of the mechanism.

The impression feed roller 18 (Figs. 2 and 11) is supported on a spindle 18ᵃ journaled in one end of a rock arm 53 (Fig. 3) pivoted to the underside of the table B and yieldingly held toward the die-roller 19 by a suitable spring 54. The spindle 18ᵃ of this roller 18 carries one socket member of another universal joint connection 44ᵇ the other socket member thereof being connected to the spindle of a spur gear 55 below the table A (Fig. 11).

The printing die, or roller, or other marking surface, 19, (Figs. 2, 3, 11) is opposed to the impression or feed roller 18, and is removably mounted upon the upper end of a vertical spindle 56, having bearings in the tables B and A and in a bracket 57 attached to the under side of table A, its lower end resting upon a wear-plate 58. The die 19 may be splined or keyed on spindle 56 so that it must rotate therewith but can be easily lifted off of or slipped back on the end of the spindle, the die 19 being removable and replaceable without disturbing any other part of the mechanism and carries no other member but itself. The die spindle 56, carries a rigid arm 59, having an idler roller (Figs. 9 and 10) arranged to meet the idler roller on the stop lever 7, and thus normally hold the spindle 56 against rotation. When the stop lever 7 is moved to release arm 59,—by the action of the leading end of the piece of mail matter in rocking the trip-finger 2 as above described,—the said die spindle can rotate, but the quick return of the trip-finger 2, under the action of the spring 89, restores the stop lever 7 in position to again engage the arm 59 and stop the die-spindle 56 upon the completion of a single rotation.

To cause the rotation of the die spindle 56 when released, a gear 60 (Fig. 11) is loosely mounted thereon in mesh with gear 55, and gear 60 is frictionally connected to the spindle by being interposed between a head 61, fast to the spindle 56, and a vertically slidable disk 62 keyed to the spindle (Fig. 11); oiled felt disks $f$ loose on the shaft being interposed between the head and gear, and disk and gear, to lessen wear and insure proper friction. The friction pressure against the opposite sides of the gear 60 is regulated by a coiled spring 63 which may be arranged in the spindle to bear against the key of disk 62 and its tension can be adjusted by a screw 64 in the end of the spindle, access to which screw can be had through a hole in the wear-plate 58. The marking die, or other device, 19, on the end of the spindle 56 is thus mounted wholly independent of the stop arm 59, and of the frictional drive therefor, so that the said die may be removed without disturbing any other part.

The inking felt roller 25 that supplies ink to the marking die 19, is carried loosely on a stud projecting from an adjustable plate 65 attached to table B (Figs. 2 and 11). The fountain roll 26 is preferably a truncated cone rotatably mounted on an inclined stud in the ink fountain or trough 66, so that the vertical face of the fountain roll is opposed to the roller 25, and its horizontal face is just immersed in the ink, the supply of which may be very small. The fountain roll is rotated by frictional contact with the felt roller during the rotation of the impression surface. As too much ink would be supplied to the felt roller if the fountain roll was continually in contact therewith, the fountain and its roll are mounted to slide within narrow limits on a guide bracket 67 against the tension of a spring 68 that normally holds the fountain roll away from the felt roll (Fig. 11). A momentary inward movement of the fountain by hand will cause the truncated roll 26 to supply sufficient ink to the felt roller 25.

The delivery roller 20 (Figs. 1, 2, 12) is fast to the upper end of a vertical spindle 69 having bearings in the tables A and B, and carrying a spur gear 70 on its lower end. The companion delivery roller 21 is mounted on a short spindle 21ᵃ in a rock arm 71 (Figs. 3 and 11) pivoted to the underside of the table B and yieldingly held toward roller 20 by a suitable spring 72. The spindle 21ᵃ carries one socket member of another universal joint connection 44ᶜ the other socket member being fastened to the shaft of a spur gear 73 lying below the table A and in mesh with the gear 70 (Fig. 12).

The stacker star wheel 22 (Figs. 1, 2, 13) is attached to the upper end of a vertical spindle 74 mounted in bearings in the tables A and B, and having on its lower end, below the table A, a spur gear 75. A bevel gear 76 is fast to shaft 74 and meshes with a bevel pinion 77 on a transverse driving spindle mounted in a bearing 79 fast to the top of table A, and carrying a pulley 80, receiving motion from any suitable source of power, as for instance a small electric motor (not shown).

In addition to the gears already described there are below the table A (see Fig. 3) an intermediate 81 between the gears 75 and 70; another intermediate 82 between the gears 70 and 55; another intermediate 83 between the gears 60 and 50; and still another intermediate 84 between the gears 52 and 42. Thus motion is transmitted by direct gearing from the driving spindle to all the other spindles in the machine.

The adjustable end stop 24 is mounted in a bracket 87 on the table B (Figs. 2, 13 and 14), and is provided with one or more notches in the lower edge of its rear side, either of which may be engaged with a spring seated catch 88 in the bracket, to removably hold the stop in its adjusted position, according as the length of the mail matter being printed may require; the stop being readily changeable in position against the holding action of the catch, by longitudinally pulling or pushing the engaging portion of the stop.

While the improvements are described in connection with a machine for printing mail matter it is obvious that they may be employed in a machine for other uses of a related nature, such as check markers, and counting machines.

What I claim is:

1. In a mail marking or similar machine, the combination of an endless traveling belt, its supporting drums, its hinged supporting arms, and an adjustable rock frame connected with one of said arms whereby the belt may be stretched or loosened.

2. In a mail marking machine, the combination of a feed belt, a pair of drums supporting said belt, a hinged supporting arm for one end of each drum, which arms may be tripped to permit the belt to be removed from the drums; with a pivoted support for the bearings of one drum, and means for rocking said support so as to adjust such drum laterally and tension the belt.

3. In a mail marking machine, the combination of a feed belt, a pair of drums supporting said belt, a supporting arm at one end of each drum, and a hinged supporting arm at the other end of each drum, adapted to be dropped to permit the belt to be removed from the drums; with a pivoted support for the arms of one drum, and means for rocking said support so as to adjust the drum laterally and tension the belt.

4. In a mail marking machine having a top plate, the combination of a pair of forwarding rolls, a trip-finger adapted to extend across the path of the mail matter passing between said rolls, a divided pivoted support for said trip-finger mounted partially above and partly below the top plate of the machine, and means connected with said support below the top plate permitting said support to laterally yield with respect to the traveling mail matter, and means connected with the finger below the top plate to hold it yieldingly in mail engaging position.

5. In a mail marking machine having a top plate, the combination of a pair of forwarding rolls, a trip-finger adapted to extend across the path of the moving mail, a pivoted arm carrying said finger, the pivot pin of said finger extending below said arm and through the top plate upon which the finger and rolls are mounted; a second arm connected to said pivot pin below the plate, spring controlled means engaging said second arm adapted to cause it to swing the finger toward the rolls, and spring actuated devices adapted to swing the carrying arm and finger toward the path of the mail.

6. In a mail marking machine, the combination of forwarding rolls, a plate above which the rolls are mounted, a pivoted arm, a spring for swinging said arm toward the path of the mail matter; a pin journaled in the free end of said arm and passing through a slot in the plate, a trip-finger connected to the upper end of said pin, and spring controlled means connected to the lower end of said pin whereby the finger is yieldingly pressed toward the roll.

7. In a mail marking machine, the combination of forwarding rolls, a plate above which the rolls are mounted, a pivoted arm, a spring for swinging said arm toward the path of the mail matter: a pin journaled in the free end of said arm and passing through a slot in the plate, a trip-finger connected to the upper end of said pin; an arm on the lower end of said pin; a pivoted stop lever, a link connecting said lever with the arm on the lower end of said pin, and trip mechanism controlled by said lever.

8. In a mail marking machine, the combination of forwarding rolls, a plate above which the rolls are mounted, a pair of arms located above and below the plate and rigidly connected to a pivot passing through the plate; a spring for swinging said arms toward the path of the mail matter, a pin journaled in the free ends of said arms and passing through a slot in the plate, a trip-finger connected to the upper end of said pin, and spring controlled means connected to an arm on the lower end of said pin whereby the finger is yieldingly pressed toward the roll.

9. In a mail marking machine, the combination of forwarding rolls, a plate above which the rolls are mounted, a pair of arms located above and below the plate and rigidly connected to a pivot passing through the plate, a spring for swinging said arms toward the path of the mail matter, a pin journaled in the free ends of said arms and passing through a slot in the plate; a trip-finger connected to the upper end of said pin, an arm connected to the lower end of the pin, a stop lever, a link connecting said lever with the arm on the lower end of said pin, and trip mechanism controlled by said lever.

10. In a mail marking machine, the combination of a pair of forwarding rolls, marking devices adjacent the forwarding rolls, means for intermittently operating the marking devices, and a stop controlling the operation of said devices; with a trip-finger extending across the path of the moving mail matter, a divided support therefor, one portion located above the machine top plate, and the other below said plate, said finger being rockable on said support, and said support being pivotally mounted in the plate, and means for releasing the stop controlled by said trip-finger.

11. In a mail marking machine, the combination of a pair of forwarding rolls, a pair of marking devices comprising an impression roller and a rotary marker adjacent the forwarding rolls, frictional means for operating the marker, and a spring actuated stop lever controlling the operation of said means; with a trip-finger extending across the path of the moving mail matter, a divided support therefor, one portion located above the machine top plate, and the other below the said plate, said finger being rockable in said support, and said support being pivotally supported in the plate, and means connected with the trip-finger controlling said stop lever.

12. In a mail marking machine, the combination of a pair of forwarding rolls, marking devices adjacent the forwarding rolls, and a stop controlling the operation of said marking devices; with a pair of arms located above and below the top plate and rigidly connected to a pivot passing through the plate, a spring for swinging said arms toward the path of the mail matter, a pin journaled in the free ends of said arm and passing through a slot in the plate, a trip-finger connected to the upper end of said pin, and spring controlled means connected to an arm on the lower end of said pin whereby the finger is yieldingly pressed toward the roll.

13. In a mail marking machine having a top plate, the combination of a pair of forwarding rolls, marking devices comprising an impression roller and a rotary die adjacent the forwarding rolls, frictional means for operating the die, and a spring actuated stop lever controlling the operation of said die; with a pair of arms located above and below the plate and rigidly connected to a pivot passing through the plate, a spring for swinging said arms toward the path of the mail matter, a pin journaled in the free ends of said arms and passing through a slot in the plate, a trip-finger connected to the upper end of said pin, and spring controlled means connected to an arm on the lower end of said pin whereby the finger is yieldingly pressed toward the roll.

14. In a mail marking machine having a top plate, the combination of a pair of forwarding rolls, a trip-finger adapted to project across the path of the moving mail matter, a divided support for said trip-finger, one portion located above the top plate and the other below the said plate, said finger being pivoted upon said support and said support being pivotally supported in the plate, a printing member and means below the plate for controlling the operation of the printing member by said trip, 15. In a mail marking machine having a top plate, the combination of a pair of forwarding rolls, a trip-finger adapted to project across the path of the moving mail matter, a divided pivoted support therefor having one portion above the top-plate and the other below said plate, and springs below the plate yieldingly holding the support and the trip-finger to duty.

16. In a mail marking machine having a top plate, the combination of a pair of feed rolls, a trip-finger adapted to extend across the path of the mail matter, a divided pivoted support for said finger mounted partly above and partly below the said top plate; with a frictionally driven printing member, an arm rigidly connected thereto, a stop engaging said arm, and means directly connecting said stop with said trip-finger.

17. In a mail marking machine, the combination of a marker carrying shaft, a friction gear loosely mounted thereon, friction disks above and below the gear, loose oiled washers on said shaft between the gear and the friction disks, and means for yieldingly pressing the friction disks and washers toward the gear; inking devices beside the upper end of said shaft, and impression devices also beside the upper end of said shaft; with a removable marker splined on the upper end of said shaft intermediate the inking and impression devices and removable and replaceable upon said shaft without disturbing any other parts of the mechanism.

18. In a mail marking machine, the combination of a marker die carrying shaft, a friction gear loosely mounted thereon, friction disks above and below the gear, loose oiled washers on said shaft between the gear and the friction disks, yieldable means for pressing the friction disks and washers toward the gear, and a marker removably splined on the upper end of said shaft; with a second shaft beside the first shaft and geared thereto, an impression roller on the upper end of said second shaft, an inking roller adjacent said marker, said marker being vertically removable from and replaceable upon its shaft without disturbing any other parts of the mechanism.

19. In a mail marking machine, the combination of a vertical marker carrying shaft, a gear loosely mounted thereon, friction disks keyed on the shaft at opposite sides of the gear, means for pressing the friction disks yieldingly into contact with said gear, and oil absorbent felt washers loosely mounted on the shaft between said disks and the gear; with means for directing mail past said marker, means for arresting the rotation of the shaft, and tripping mechanism actuated by the passing mail for releasing said arresting means.

20. In a mail marking or similar machine, the combination of a rotating feed roll, an opposed reversely rotating separator roll, a pivoted guide coöperating therewith, a bearing for said separator roll, a pair of parallel guide pins attached to the outer side of said guide and supporting said bearing, a yoke connecting the outer ends of said pins, and an adjusting screw tapped through said yoke intermediate said pins and engaging said bearing for regulating the position of said roll with respect to said pivoted guide.

In testimony that I claim the foregoing as my own, I affix my signature in presence of two witnesses.

GEORGE H. GRAHAM.

Witnesses:
THOMAS F. BOWES,
JAMES R. MANSFIELD.